United States Patent
Levine et al.

(10) Patent No.: US 8,958,979 B1
(45) Date of Patent: Feb. 17, 2015

(54) SYSTEM AND METHOD FOR ROAD MAP CREATION

(71) Applicant: WAZE Mobile Ltd., Ra'anana (IL)

(72) Inventors: Uri Levine, Kfar Saba (IL); Amir Shinar, Moshav Herut (IL); Ehud Shabtai, Tel-Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/069,051

(22) Filed: Oct. 31, 2013

Related U.S. Application Data

(62) Division of application No. 12/199,187, filed on Aug. 27, 2008, now Pat. No. 8,612,136.

(51) Int. Cl.
*G01C 21/00* (2006.01)
*G01C 21/26* (2006.01)

(52) U.S. Cl.
CPC ....................................... *G01C 21/26* (2013.01)
USPC ........... 701/408; 701/409; 701/411; 701/416; 701/422; 701/445; 701/451; 701/461; 701/466; 340/905; 340/995.1; 340/989; 340/988; 340/990

(58) Field of Classification Search
CPC ........ G01C 21/00; G01C 21/20; G01C 21/26; G01C 21/206; G01C 21/34; G01C 21/32; G01C 21/30; G01C 21/3679; G01C 21/3629; G01C 21/3697; G01C 21/16; G01C 21/3415; G01C 21/3438; G01C 21/36
USPC .......... 701/200, 202, 208, 209, 213; 340/990, 340/995
See application file for complete search history.

(56) References Cited

U.S. PATENT DOCUMENTS

| 5,428,544 | A | * | 6/1995 | Shyu | ............................. | 701/117 |
| 5,845,228 | A | * | 12/1998 | Uekawa et al. | ............... | 701/410 |
| 6,047,234 | A | * | 4/2000 | Cherveny et al. | ............. | 701/451 |
| 6,111,539 | A | * | 8/2000 | Mannings et al. | ........ | 342/357.31 |
| 6,150,961 | A | * | 11/2000 | Alewine et al. | ............. | 340/995.1 |
| 6,208,935 | B1 | * | 3/2001 | Yamada et al. | ............... | 701/410 |

(Continued)

FOREIGN PATENT DOCUMENTS

JP  2000298793 A  * 10/2000 ............... G08G 1/00

OTHER PUBLICATIONS

Kanoh, H., "Dynamic route planning for car navigation systems using virus generic algorithms," International Journal of Knowledge-Based and Intelligent Engineering Systems, Jan. 2007. http://www/kslab.cs.tsukuba ac.ac.jp/paper/kanoh_KES2007.pdf.

(Continued)

*Primary Examiner* — Redhwan k Mawari
(74) *Attorney, Agent, or Firm* — Lerner, David, Littenberg, Krumholz & Mentlik, LLP

(57) ABSTRACT

The present invention provides system and method for creation of a road map, the system comprising a plurality of navigation devices; and an application server to receive from the plurality of navigation devices time series of location points, and to create a road map based on the time series of location points. The method comprising receiving location points from plurality of navigation devices, along with respective time stamps indicating the time of recordation of each of the location points; identifying at least one route according to the location points and respective time stamps; and creating a road map based on the at least one route.

14 Claims, 2 Drawing Sheets

(56) References Cited

U.S. PATENT DOCUMENTS

| | | | |
|---|---|---|---|
| 6,385,539 B1* | 5/2002 | Wilson et al. | 701/468 |
| 6,459,988 B1 | 10/2002 | Fan et al. | |
| 6,473,693 B1* | 10/2002 | Kusama | 701/436 |
| 6,529,159 B1 | 3/2003 | Fan et al. | |
| 6,552,682 B1 | 4/2003 | Fan | |
| 6,594,576 B2 | 7/2003 | Fan et al. | |
| 6,664,922 B1 | 12/2003 | Fan | |
| 6,795,017 B1 | 9/2004 | Puranik et al. | |
| 6,832,140 B2 | 12/2004 | Fan et al. | |
| 6,862,502 B2* | 3/2005 | Peltz et al. | 701/19 |
| 6,862,524 B1 | 3/2005 | Nagda et al. | |
| 6,867,733 B2 | 3/2005 | Sandhu et al. | |
| 6,882,313 B1 | 4/2005 | Fan et al. | |
| 6,922,566 B2 | 7/2005 | Puranik et al. | |
| 6,973,384 B2 | 12/2005 | Zhao et al. | |
| 6,992,598 B2* | 1/2006 | Poltorak | 340/995.19 |
| 7,006,820 B1 | 2/2006 | Parker et al. | |
| 7,035,620 B2 | 4/2006 | Ben-Efraim et al. | |
| 7,043,255 B1 | 5/2006 | Tiwari | |
| 7,203,721 B1 | 4/2007 | Ben-Efraim et al. | |
| 7,219,123 B1 | 5/2007 | Fiechter et al. | |
| 7,269,505 B2 | 9/2007 | Zhao et al. | |
| 7,286,857 B1 | 10/2007 | Walker et al. | |
| 7,301,925 B2 | 11/2007 | Fan et al. | |
| 7,319,931 B2 | 1/2008 | Uyeki et al. | |
| 7,430,472 B2 | 9/2008 | Zhao et al. | |
| 7,440,842 B1 | 10/2008 | Vorona | |
| 7,451,042 B2 | 11/2008 | Uyeki et al. | |
| 7,469,827 B2* | 12/2008 | Katragadda et al. | 235/384 |
| 7,613,564 B2 | 11/2009 | Vorona | |
| 7,642,928 B2* | 1/2010 | Hutchison | 340/907 |
| 7,671,764 B2 | 3/2010 | Uyeki et al. | |
| 7,680,594 B2 | 3/2010 | Cabral et al. | |
| 7,680,596 B2 | 3/2010 | Uyeki et al. | |
| 7,779,444 B2 | 8/2010 | Glad | |
| 7,912,628 B2 | 3/2011 | Chapman et al. | |
| 8,121,780 B2 | 2/2012 | Gerdes et al. | |
| 8,271,057 B2 | 9/2012 | Levine et al. | |
| 2002/0082771 A1 | 6/2002 | Anderson | |
| 2002/0108125 A1 | 8/2002 | Joao | |
| 2003/0014187 A1 | 1/2003 | Chun et al. | |
| 2003/0040944 A1 | 2/2003 | Hileman | |
| 2003/0054810 A1 | 3/2003 | Chen et al. | |
| 2003/0154480 A1* | 8/2003 | Goldthwaite et al. | 725/46 |
| 2004/0059503 A1* | 3/2004 | Peters | 701/300 |
| 2004/0068364 A1 | 4/2004 | Zhao et al. | |
| 2004/0104842 A1 | 6/2004 | Drury et al. | |
| 2004/0158392 A1* | 8/2004 | Choi | 701/201 |
| 2004/0213459 A1* | 10/2004 | Ishimaru et al. | 382/191 |
| 2004/0249568 A1* | 12/2004 | Endo et al. | 701/209 |
| 2005/0027436 A1 | 2/2005 | Yoshikawa et al. | |
| 2005/0033511 A1 | 2/2005 | Pechatnikov et al. | |
| 2005/0049771 A1 | 3/2005 | Kuang et al. | |
| 2005/0083211 A1* | 4/2005 | Shafir et al. | 340/905 |
| 2005/0206657 A1* | 9/2005 | Arcas | 345/660 |
| 2005/0216301 A1* | 9/2005 | Brown | 705/1 |
| 2005/0222751 A1 | 10/2005 | Uyeki | |
| 2005/0222760 A1 | 10/2005 | Cabral et al. | |
| 2005/0222764 A1 | 10/2005 | Uyeki et al. | |
| 2005/0288046 A1 | 12/2005 | Zhao et al. | |
| 2005/0288856 A1 | 12/2005 | Uyeki et al. | |
| 2006/0025923 A1 | 2/2006 | Dotan et al. | |
| 2007/0010941 A1* | 1/2007 | Marsh | 701/209 |
| 2007/0024467 A1* | 2/2007 | Fujii | 340/937 |
| 2007/0047102 A1* | 3/2007 | Aguera Y Arcas | 359/689 |
| 2007/0106465 A1 | 5/2007 | Adam et al. | |
| 2007/0118273 A1* | 5/2007 | Tang et al. | 701/117 |
| 2007/0129885 A1* | 6/2007 | Wellmann | 701/209 |
| 2007/0138347 A1 | 6/2007 | Ehlers | |
| 2007/0213004 A1 | 9/2007 | DaCosta | |
| 2007/0299599 A1* | 12/2007 | Letchner et al. | 701/200 |
| 2008/0022329 A1 | 1/2008 | Glad | |
| 2008/0046173 A1* | 2/2008 | Lappe et al. | 701/209 |
| 2008/0088479 A1* | 4/2008 | Caminiti et al. | 340/932 |
| 2008/0140305 A1* | 6/2008 | Kim et al. | 701/117 |
| 2008/0148176 A1 | 6/2008 | Mita | |
| 2008/0195664 A1 | 8/2008 | Maharajh et al. | |
| 2008/0262721 A1 | 10/2008 | Guo et al. | |
| 2008/0271072 A1 | 10/2008 | Rothschild et al. | |
| 2009/0037097 A1 | 2/2009 | Cho et al. | |
| 2009/0044235 A1 | 2/2009 | Davidson | |
| 2009/0070031 A1* | 3/2009 | Ginsberg | 701/208 |
| 2009/0118995 A1 | 5/2009 | Zhao et al. | |
| 2009/0164110 A1 | 6/2009 | Basir | |
| 2009/0240424 A1 | 9/2009 | Hayes-Roth | |
| 2010/0037248 A1 | 2/2010 | Lo et al. | |
| 2010/0057336 A1* | 3/2010 | Levine et al. | 701/200 |
| 2010/0231383 A1 | 9/2010 | Levine et al. | |

OTHER PUBLICATIONS

International Search Report dated Feb. 3, 2010 for PCT/IB09/53129.
Office Action mailed Jan. 23, 2013, U.S. Appl. No. 12/588,786, filed Oct. 28, 2009, Israel Disatnik et al.
Office Action dated Aug. 29, 2012, U.S. Appl. No. 12/588,786, filed Oct. 28, 2009, Israel Disatnik et al.
Foreign Examination Report, Jun. 15, 2012, Application No. GB1103640.7.

* cited by examiner

SYSTEM AND METHOD FOR ROAD MAP CREATION

CROSS-REFERENCE TO RELATED APPLICATIONS

The present application is a divisional of co-pending U.S. patent application Ser. No. 12/199,187, filed on Aug. 27, 2008, and entitled "SYSTEM AND METHOD FOR ROAD MAP CREATION," which is hereby incorporated by reference in its entirety.

BACKGROUND OF THE INVENTION

There are known services providing navigation maps, for example, manual hard-copy maps, GPS maps, internet maps, and other kinds of navigation maps. None of these maps, however, is a navigational dynamic map which may be updated based on data which may be received continuously.

Additionally, there are services which calculate estimated preferred routes, for example, based on pre-calculated stored data, such as, for example, data on traffic lights, average velocities, roads conditions and other suitable data. The calculation of the estimated preferred route by these services may base on out-of date data and/or maps.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
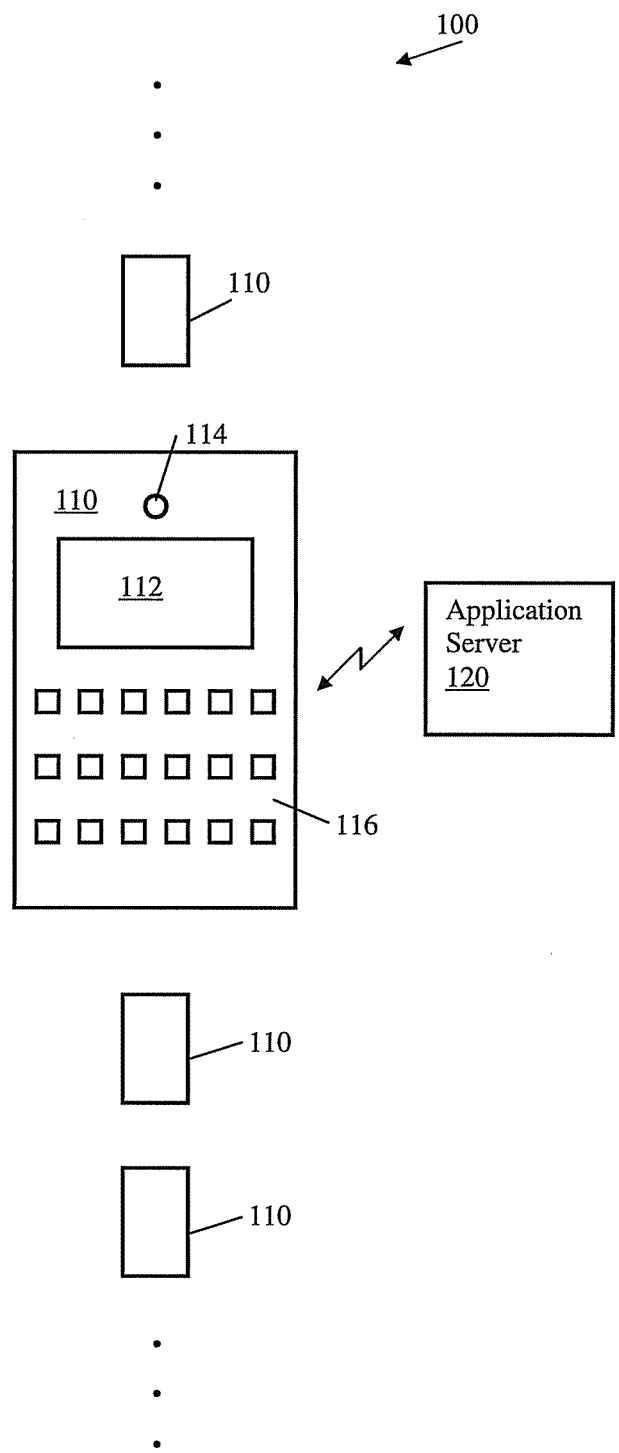
FIG. 1 is a schematic illustration of a system for creation of a road map according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which is a schematic illustration of a system 100 for creation of a road map according to some embodiments of the present invention.

System 100 may include a plurality of navigation devices 110, each of the navigation devices may belong to a member of a road mapping service which may be provided by system 100. Navigation devices 110 may include, for example, GPS devices, mobile phones, Personal Digital Assistants (PDA), Personal Navigation Devices (PND), car PC, mobile computers, or any other suitable devices able to include, receive and manipulate and/or operate navigation software and/or device which is capable of identifying its own location and time and either send it or store it and/or any sensor which may sense and record its location and time. The plurality of navigation devices 110 with connectivity capability may be in communication with application server 120, for example, by a cellular network or wireless network or any other mobile communication means. The connection between navigation devices 110 and application server 120 may be made by any known connection protocol, for example, Transmission Control Protocol (TCP), User Datagram Protocol (UDP), Hypertext Transfer Protocol (HTTP), Wireless Application Protocol (WAP) or any other suitable protocol.

Application server 120 may receive from navigation device 110, for example, periodically, momentary locations of the member holding device 110. Application server 120 may collect and/or record time series of locations received from device 110 along with time stamps indicating the time at which each of the locations was recorded. In some embodiments, navigation device 110 may record momentary locations together with corresponding time stamps indicating the recordation times of these momentary locations. A momentary location may be recorded by navigation device 110, for example, in constant time intervals, for example, once in a second, or/and in constant travel distances, for example, every ten meters. Application server 120 may receive a time series of location points, along with the time stamps indicating the time at which each of the location points was recorded. Time series of location points may be received by application server 120 in constant time intervals as desired, for example, every five minutes.

Additionally, the members may send to application server 120, for example, by navigation devices 110, information on different events, for example, traffic information and/or alerts and/or messages to other members.

Application server 120 may perform statistical analysis of the received time series of location points from plurality of navigation devices 110. Based on the statistical analysis, application server 120 may identify navigation patterns which may correspond to different road characteristics which may facilitate creation of a road map. Based on these patterns, application server 120 may create a dynamic navigational road map which may be updated, for example, whenever the statistical analysis shows a change in the navigation patterns. The navigational road map may be displayed, for example, on a display 112 of navigation device 110. Additionally, application server 120 may provide navigational instructions, for example, based on the created navigational map. The instructions may be displayed, for example, on display 112. Additionally or alternatively, the instructions may be voiced by a speaker 114 which may be included in navigation device 110.

Application server 120 may deduce from the time series of location points received from navigation device 110, the momentary magnitudes and directions of velocities of the user holding navigation device 110. Application server 120 may perform analysis to identify navigation patterns with different times in the day and/or days in the week.

By analyzing statistically the time series of location points received from plurality of navigation devices, application server 120 may identify, for example, static road characteristics and/or point of interest such as, for example, one-way roads, two-way roads, dead ends, junctions of different types, allowable and unallowable turns, roundabouts, speed bumps, overpasses, underpasses, tunnels, number of lanes, speed limits, traffic lights, traffic signs, gas stations, parking lots, and other static road characteristics and/or points of interest. Application server may create a road map, for example, based on the identified static road characteristics and/or points of interest.

Additionally, application server 120 may perform statistical calculations to identify time-related characteristics such as, for example, traffic signs which apply for certain times of a day and/or days of a week, turns which are allowable/unallowable in certain times of a day and/or days of a week, average red light duration of traffic lights according to the time in a day and/or day in a week, traffic condition according to the time in a day and/or day in a week and other time-related characteristics.

From the time series of location points received from plurality of navigation devices 110, application server 120 may deduce routes, locations, directions of travel and other parameters which may enable creation of a navigational map.

In some cases, there may be deviations between the navigation devices 110 and/or slight inaccuracies in the location points received from the different navigation devices 110. Application server 120 may perform statistical analysis in order to identify the most probable routes. Application server may create and/or update the road map so that it includes the most probable routes as the roads in the road map.

Navigation device 110 may include, for example, a display 112, on which a navigational map, for example, created by application server 120, may be displayed. Additionally, messages, questions, and/or other information may be displayed on display 112. The messages, questions, and/or other information may be received from application server 120 and/or from other persons, for example, users of other navigation devices 110 or other suitable devices. Navigation device 110 may also include keyboard 116, for example, to control navigation device 110 and/or for entering messages, alerts, and other information, for example, in order to send it to application server 120 and/or to other navigation devices 110 and/or any other suitable devices. Navigation device 110 may additionally include speaker 114, which may enable receiving voice messages and/or alerts.

Figure 2:
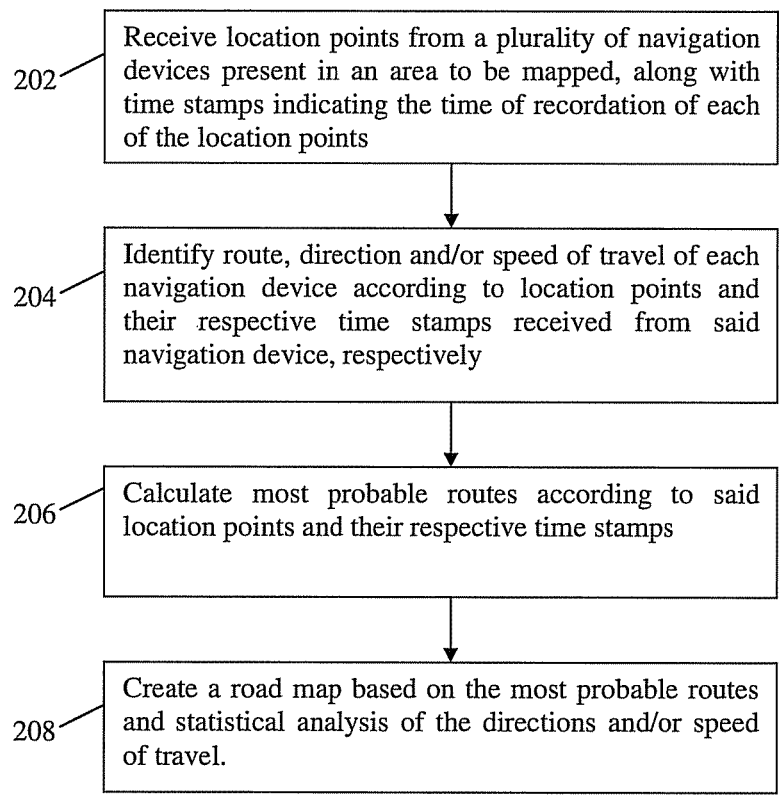
FIG. 2 is a flow chart illustrating a method for creation of a road map according to some embodiments of the present invention.

Reference is now made to FIG. 2, which is a flow chart illustrating a method for creation of a road map according to some embodiments of the present invention. As shown in block 202, the method may include, for example, receiving, for example, by application server 120, location points from a plurality of navigation devices 110 present in an area to be mapped, along with time stamps indicating the time of recordation of each of the location points. As shown in block 204, the method may include, for example, identifying, for example, by application server 120, route, direction and/or speed of travel of each navigation device 110 according to location points and their respective time stamps received from said navigation device, respectively. As shown in block 206, the method may include, for example, calculating, for example, by application server 120, most probable routes according to the received location points and their respective time stamps. As shown in block 208, the method may include, for example, creating, for example, by application server 120, a road map based on the most probable routes and statistical analysis of the directions and/or speed of travel.

Application server 120 may calculate the average durations of travel in certain portions of roads/intersections based on, for example, the received location points and their respective time stamps, and/or the speed that may be calculated therefrom.

Application server 120 may identify, for example, a one way road, if, for example, in a certain identified route, the statistical analysis shows pronouncedly that close to 100% of the navigation devices 110 report on substantially the same general direction of travel.

Application server 120 may identify, for example, a two way road, if, for example, in a certain identified route, the statistical analysis shows pronouncedly that along time the navigation devices 110 travel in both direction of the road.

Additionally, application server 120 may identify different road characteristics such as, for example, traffic restrictions, special road features, traffic signs, traffic lights and/or different kinds of intersections.

Application server 120 may perform a statistical analysis of the travel routes, for example, in an intersection. An intersection may be recognized by application server 120 if, for example, in a certain area, two or more routes intersect and/or draw near each other when coming towards certain area and then draw away from each other when going outwards of this area. Application server 120 may identify based on the statistical analysis deferent kinds of intersections, for example, T-intersection, roundabouts, intersections with overpass/underpass and/or intersections with certain turning limitations.

Application server 120 may process the received location points and respective time stamps to identify the kinds of turns, for example, right turn, left turn, U-turn, keeping straight and/or other kinds of turns possible in an intersection. Application server 120 may conclude from the kinds of turns performed in a junction, which turns are allowed in the junction. For example, if in a certain junction application server 120 does not detect a significant amount of turns of a certain kind, for example, average number of turns below a certain predetermined threshold or according to any other suitable statistical measurement, it may conclude that this kind of turn is not allowed in the junction, and mark the road map accordingly. Alternatively, if in a certain junction application server 120 detects a significant amount of turns of a certain kind, for example, above a certain threshold, application server 120 may conclude that this kind of turn is allowed in the junction, and mark the road map accordingly. Application server 120 may also identify based on, for example, statistical analysis it may perform on the location, time and/or speed data received from navigation devices 110, traffic signs, traffic lights and/or other traffic orders which are applicable only for some hours in a day and/or days in a week. Application server 120 may indicate in the map when the traffic signs, traffic lights and/or other traffic orders are applicable. Application server 120 may indicate the traffic signs, traffic lights and/or other traffic orders in the map only when they are active and/or applicable and/or mark them as active/inactive in respective times in the day and/or days in the week. Similarly, application server 120 may put indications on the map regarding certain turns which may be allowed in certain hours in the day and/or days in the week.

Application server 120 may detect roundabouts, for example, by detecting portions of routes which join to a closed loop and/or lack of location points in the center of an intersection and/or a route having substantially consistent direction diversion around a closed loop and/or by other methods, according to analysis of the location points and corresponding time stamps received from navigation devices 110. Application server 120 may indicate the detected roundabout in the map.

Overpass/underpass intersections may be identified by application server 120 when an intersection is identified without detected stop signs and/or traffic lights and/or with lack of significant decrease in speed when drawing near the intersection. For example, application server 120 may identify and/or indicate in the map an overpass/underpass intersection if the travel speed in the intersection area and/or near the intersection area is pronouncedly above certain threshold in most cases.

Some of navigation devices 110 can be motion sensitive and send movement signals to application server 120. Additionally or alternatively, motion sensors may be held proximately to at least some of the users by other means, and send movement signals to application server 120. Application server 120 may analyze the motion signals, optionally along with location, time and/or speed data, and identify road bumps, speed bumps and/or severe road conditions. For example, interferences in speed and/or movements signals which are similar in shape and/or which occur in substantially constant intervals or in other known standard intervals may be identified by application server 120 as speed bumps and, for example, indicate the speed bumps on the map. Interferences in speed and/or movements signals which are irregular, may be identified by application server 120 as occasional road bumps or/and sever road conditions. Application server 120 may indicate irregularities in the road such as, for example, the occasional road bumps or/and sever road conditions, on the map and, for example, indicate the severity of the irregularities according to the frequency and/or strength of the received motion signals.

Application server 120 may receive inputs from other and/or additional sensors which may sense the roads and/or traffic. The sensors may be stationary and/or move independently from the users and/or included in navigation devices 110 and/or held proximately to at least some of the users by other means. The sensors may include, for example, image sensors, light sensors, motion sensors, voice sensors, or any other suitable sensors. In one exemplary embodiment of the present invention, satellite images may be received and used by application server 120 to identify traffic and/or road conditions and/or patterns of traffic and/or road conditions. For example, satellite images may be received and used by application server 120 to identify patterns of a traffic light.

Application server 120 may identify portions of roads in which the communication with navigation devices 110 is cut off and restored again after a certain distance. This may be detected by application server 120 as "disappearance" and "reappearance" of users. Application server 120 may identify a pronounced consistent "disappearance" and "reappearance" of users in substantially the same portion of the road, thus deducing the existence of a tunnel in this portion of the road. Application server 120 may mark the location of the identified tunnel on the navigation map.

In some embodiments of the present invention, application server 120 may store data and/or definitions which, for example, in combination with data received in real time, such as, for example, location points received from navigation devices 110 along with time stamps, may facilitate identification of different road parameters and features.

Application server 120 may store for example, lane definitions, which may include, for example, average lane width. Application server 120 may identify the number of lanes in a road/highway by analyzing the dispersal area of the location points received from navigation devices 110 in, for example, a selected segment. Application server 120 may identify, at least approximately, the width of the dispersal area in a segment and deduce the number of lanes in the segment, for example, by dividing the width of the dispersal area by the average lane width. Application server 120 may identify boundaries between the lanes by analyzing the distribution of the location points received from navigation devices 110. Application server 120 may indicate the number of lanes of road segments in the created navigation map.

Some of the lanes in a road may have certain characteristics which may be identified by application server 120 and indicated in the map. Application server 120 may identify, for example, by analysis of location points received from navigation devices 110 along with the respective time stamps, the direction of travel in each lane.

Other lanes may be assigned for certain vehicles, such as, for example, a lane for public transportation and/or a lane for high-occupancy vehicle, for example, two or more persons per vehicle. These assigned lanes may be characterized, for example, by being less loaded than other lanes and thus, for example, the speed of travel in those lanes may be higher. Application server 120 may identify these lanes, for example, by analysis of location points received from navigation devices 110 along with the respective time stamps.

Some other lanes may be assigned for right turns only or for left turns only. These lanes may be identified by application server 120, for example, by recognizing that pronouncedly all the users or close to 100 percent of the users traveling in the lane turn right in a respective intersection for right-turn only lanes and/or that pronouncedly all the users or close to 100 percent of the users traveling in the lane turn left in a respective intersection for left-turn only lanes.

The specially assigned lanes may be assigned for only some hours of the day and/or days in the week. Application server 120 may recognize the hours in a day and/or days in a week in which these lanes has special characteristics, for example, by analyzing statistically, the location points, respective time stamps and/or speed data which may be received, for example, from navigation devices 110 and/or calculated by application server 120. Application server 120 may mark the special lanes in the map according to the analysis. For example, these lanes may be marked as lanes with special characteristics only in the hours in a day and/or days in a week in which these lanes function as special lanes according to the statistical analysis.

Application server 120 may recognize a stop sign, for example, by identifying that pronouncedly all the users or close to 100 percent of the users, for example, above 97 percent of the users, having speed of substantially zero at a certain point or certain small region of the road, usually, for example, within or close to an intersection area. In some cases, an intersection may include stop signs in more than one direction of the intersection, which may be recognized by application server 120. In some cases, application server 120 may recognize a stop sign in each direction of an intersection, for example, four directions, thus, for example, identifying the intersection as a 4 way stop sign type of intersection and marking it accordingly in the navigational map.

Application server 120 may recognize a traffic light, for example, by identifying cycles including periods when pronouncedly all the users or close to 100 percent of the users, for example, above 97 percent of the users, having speed of substantially zero at a certain point or certain small region of the road, usually, for example, within or close to an intersection area. Application server 120 may calculate the cycle time of the traffic light. Additionally, application server 120 may recognize patterns of changes in the cycle times of a traffic light in different time in the day and/or days in the week. Application server 120 may mark the traffic light with the cycle time respectively to the time in the day and/or days in the week. Other statistical parameters may be calculated by application server 120, such as, for example, average durations of red light and/or green light in each traffic light cycle, for example, respectively to the time in a day and/or day in a week and, for example, may be marked on the map respectively. Durations of red light may be recognized by application server 120 by identifying pronouncedly periods of substantially zero speed of users in the respective region. Durations of green light may be recognized by application server 120 by identifying pronouncedly periods of above zero speed of users in the respective region.

In some intersections, a right turn may be permitted during periods of red light. Such intersection may be recognized by application server 120, for example, by identifying an intersection where there are periods of substantially zero speed for users who turn left or keep straight, while users who turn right pronouncedly have speed of above zero substantially incessantly. This may usually be combined with a right-turn only type of lane, which may be identified by application server 120 as described above.

Application server 120 may calculate the average time it may take to cross an intersection, for example, from each direction to each direction, for example, based on the analysis of the intersection parameters, including type of intersection, traffic lights, stop signs and other parameters described in detail above. Application server 120 may recognize the average time it may take to cross an intersection, for example, for different hours in a day and/or days in a week.

Application server 120 may identify facilities at sides of the roads, such as, for example, gas stations and/or parking lots which may exist nearby a mall, restaurant or any other recreational facility. Application server 120 may identify the facilities when at a specific region a substantial amount of users deviates from an identified road, stop for a period and/or have a very slow velocity, and then returns to the road or to another identified road. The sufficient amount of users deviating from the road in order to identify a facility may be predefined and/or stored in application server 120. The velocity of movement of the navigation device may be considered by application server 120 as a halt of the vehicle if the velocity is below a certain threshold which may be, for example, predefined and/or stored in application server 120. For example, if a person walks out of the car, takes navigation device 110 with him and advances by foot, the velocity of walking may be considered by application server 120 as a halt of the vehicle.

A facility at a side of a road may be identified by application server 120 as a gas station by a relatively short average duration of stay, for example, sufficient time to fill a gas tank. The range of average durations of stay suitable for a gas station may be predefined and/or stored in application server 120. Additionally, application server 120 may identify the lane or lanes of the different gas pipe ports, by identifying the specific routes which may lead to and from the location of halt of users for filling the gas tank. The boundaries between lanes of the gas pipe ports may be identified as discussed above with reference to the lanes identification. Other gas station facilities, for example, car washing lane machines, may be identified in similar methods to the methods described above.

In other recreational facilities at sides of roads, the stay duration of users may be longer then the stay in a gas station. These facilities may include parking lots nearby malls, restaurants, movie theater complexes, and any other suitable facility. These facilities may be identified by application server 120 by recognizing a facility at a side of the road in the method described above, and by recognizing average duration of stay of users which may be above a certain threshold. This threshold may be predefined and/or stored in application server 120.

Parking lots near facilities, business locations, residential buildings, and any other parking lot may be identified by application server 120 by recognizing a large number of users halting for a time above a predetermined threshold and/or terminating their travel in the same area.

The above mentioned road conditions, characteristics and facilities may be identified by application server 120 by receiving from navigation devices 110 location points along with corresponding time stamps and performing statistical analysis of the received location points along with corresponding time stamps. In some of the cases mentioned above, calculation of speed and/or direction of navigation devices 110 may be required in order to identify the road characteristic and/or facility. In some of the cases mentioned above an analysis of the data according to the time in a day and/or day in a week may be required, for example, in order to provide information regarding characteristics of the road in the different time in a day and/or day in a week.

The above mentioned road conditions, characteristics and facilities may facilitate creation of navigational road map by application server 120, possibly along with other parameters which may be calculated by application server 120, for example, based on information received from the navigation devices 110. In some of the cases mentioned above, the analysis by application server 120 may further base on other pre-stored and/or pre-acquired data and/or predetermined parameters and/or thresholds, at least some of them are mentioned above.

Application server 120 may compare the identified characteristics calculated by application server 120 with pre-stored information, for example, in order to verify the accuracy of its identifications.

In some embodiments of the present invention, application server 120 may identify temporary and/or unusual events, for example, in real time, for example, based on information received from navigation devices 110, and indicate the temporary and/or unusual events on the created map. The temporary and/or unusual events may include, for example, traffic jams, road blocks, lane blocks, abnormal intersection activity and/or any other event which may deviate from the normal, for example, statistically calculated behavior of users identified by application server 120. Application server 120 may identify the temporary and/or unusual events by, for example, comparing the information received in real time to the statistically calculated normal characteristics and/or conditions of the roads, for example, characteristics and/or conditions of the roads which where previously calculated according to statistical analysis of the location points and time stamps received from navigation devices 110, as described in detail above.

Additionally to the location points and respective time stamps received for navigation devices 110, application device 120 may receive from navigation devices 110 other data which may facilitate creation of a navigational road map. Application device 120 may receive from navigation devices 110, for example, messages which may be manually entered by users of navigation devices 110, for example, alerts of traffic jams and other unusual events and/or information regarding traffic lights, traffic signs, one-directional lanes, and/or any other information regarding road characteristics and/or conditions, and/or any other information which may be required by application server 120. Application server 120 may request for information from a user or group of users, for example, in case there is no sufficient information received from navigation device 110, for example, in order to deduce road characteristics from this information. There may be lack in sufficient information when the number of users passed in a certain road is too small in order to identify a condition with sufficient certainty.

Application server 120 may ask for information from a client by, for example, sending a message, for example, by e-mail, SMS (short messaging service) and/or by any other suitable method. The message may include a question which may be answered by the user by typing the answer, selecting the answer from several given options and/or by any other suitable method. Exemplary question sent to a user may be "are you stopping because of a red traffic light?", "Is there traffic light at the intersection of 'Johnson Dr.' and 'Memorial Dr.'?" The user may be given the option to answer "yes" or "no", for example, by typing the answer and/or by clicking the corresponding button and/or by any other suitable manner.

Application server 120 may suggest to a user a preferred route, for example, upon a request from a user, which may indicate the start point and destination. Application server 120 may suggest to a user a preferred route, for example, based on average durations of traveling in certain roads and/or roads segments and/or intersections, which may be statistically calculated by application server 120 as described in detail above.

Application server 120 may store and/or archive traveling routes of a user, for example, according to the user's request and/or permission. Application server 120 may analyze the stored routes and, for example, identify based on the analysis commonly traveled routes by the user and/or travel habits of the user. For example, application server 120 may identify that the user usually travels from home to work between 08:00 and 09:00 on Monday to Friday. In another example, application server 120 may identify that the user usually travels from home to gym at about 18:00 on Thursdays. The descriptions of the destinations/starting points such as, for example, "home", "office", "gym", "supermarket" etc., may be provided to application server 120 by the user. When traveling in the relevant time in a day and/or day in a week, application server 120 may present the identified commonly traveled route on a navigational map, for example, on display 112, and/or provide navigational instructions to the user based on the identified commonly traveled route.

Additionally, application server 120 may suggest alternative route/s, for example, in case of existence of a shorter and/or faster route to the required destination. For example, application server 120 may compare the traffic and/or road conditions in the commonly traveled route with real-time traffic information, and may suggest, for example, based on the comparison, alternative routes, for example, with better real-time traffic and/or road conditions. Additionally and/or alternatively, application server 120 may provide alerts on unusual traffic and/or road conditions. Application server 120 may provide the alerts by messages which may be displayed on display 112 and/or voiced by speaker 114 and or by other means, for example, e-mail, short message service (SMS), instant message (IM) or any other suitable means.

A user traveling by bus and/or train may indicate this fact to application server 120. Application server 120 may use the information received from navigation devices 110 of bus/train passengers to create a map of bus/train routes.

The information received from navigation devices 110 of bus traveler may contribute, for example, to creation of navigational road map along with being used for identifying bus routes, in methods similar to the methods described above. The analysis of bus routes by application server 120 may include calculation of bus route travel duration and/or duration of travel for portions of the route, for example, in different times in a day and/or days in a week. The calculation may include, for example, identification of bus stops and/or the duration of halt in the bus stops. Application server 120 may identify bus stops by recognizing short-duration halts along the bus route.

The information received from navigation devices 110 of train traveler may contribute, for example, to creation of railway map along with being used for identifying train routes, in methods similar to the methods described above. The analysis of train routes by application server 120 may include calculation of train route travel duration and/or duration of travel for portions of the route, for example, in different times in a day and/or days in a week. The calculation may include, for example, identification of train stops and/or the duration of halt in the train stops. Application server 120 may identify train stops by recognizing short-duration halts along the train route.

Application server 120 may use the identified bus and/or train routes, for example, along with identified bus/train stops data and/or the calculated time of travel in each route and/or portions of the route, in order, for example, to calculate preferred combinations of bus/train routes and/or portions of routs to arrive a certain destination.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A non-transitory computer-readable medium storing instructions that, when executed by a source device, cause the source device perform a method of creating a road map, the method comprising:
   receiving location points from plurality of navigation devices, along with respective time stamps indicating the time of recordation of each of said location points;
   performing statistical analysis to determine existence of roads based on at least one of direction and speed of said plurality of navigation devices; and
   creating a dynamic navigational road map based on said at least one route that includes determined existing roads; and
   determining road characteristics of at least one of said determined existing roads, based on navigation patterns of said location points and respective time stamps.

2. The non-transitory computer-readable medium of claim 1, wherein said creating a dynamic navigation road map is based on said at least one of direction and speed.

3. The non-transitory computer-readable medium of claim 1, further comprising calculating average durations of travel in certain portions of roads and/or intersections based on said location points and respective time stamps.

4. The non-transitory computer-readable medium of claim 1, further comprising identifying based on said statistical analysis at least one road characteristic.

5. The non-transitory computer-readable medium of claim 4, wherein said at least one road characteristic is at least one of a list comprising a one way road, two-way road, traffic restrictions, traffic signs, traffic lights, intersection, T-intersection, roundabout, overpass/underpass, tunnels, turning limitations, number of lanes, public transportation lanes, a lane for high occupancy vehicles, lanes for right/left turns only.

6. The non-transitory computer-readable medium of claim 1, further comprising identifying based on said statistical analysis allowability of at least one kind of turn of a list comprising U-turn, left turn, right turn and keeping straight.

7. The non-transitory computer-readable medium of claim 6, wherein said identifying allowability of at least one kind of turn is based on a predetermined threshold of average number of identified performed turns of said at least one kind.

8. The non-transitory computer-readable medium of claim 4, wherein said identifying at least one road characteristic is further based on predetermined thresholds.

9. The non-transitory computer-readable medium of claim 4, wherein said identifying at least one road characteristic is further based on said statistical analysis and pre-stored data, definitions and/or thresholds.

10. The non-transitory computer-readable medium of claim 1, further comprising receiving motion signals and identifying at least one of a list comprising road bumps, speed bumps and severe road conditions.

11. The non-transitory computer-readable medium of claim 1, further comprising identifying road characteristics with respective times in a day and/or days in a week.

12. The non-transitory computer-readable medium of claim 1, further comprising calculating average durations of travel in roads, portions of roads and intersections.

13. The non-transitory computer-readable medium of claim 1, wherein said dynamic navigation road map includes at least one road characteristic of said determined existing roads.

14. The non-transitory computer-readable medium of claim 10, wherein said dynamic navigation road map includes said road bumps, said speed bumps and said severe road conditions.

* * * * *